United States Patent
Subbaraman et al.

(10) Patent No.: US 11,515,571 B2
(45) Date of Patent: Nov. 29, 2022

(54) HOT MELT EXTRUDED SOLID STATE BATTERY COMPONENTS

(71) Applicant: Robert Bosch GmbH, Stuttgart (DE)

(72) Inventors: Ram Subbaraman, Sunnyvale, CA (US); Saravanan Kuppan, Sunnyvale, CA (US)

(73) Assignee: Robert Bosch GmbH, Stuttgart (DE)

(*) Notice: Subject to any disclaimer, the term of this patent is extended or adjusted under 35 U.S.C. 154(b) by 136 days.

(21) Appl. No.: 16/976,977

(22) PCT Filed: Feb. 26, 2019

(86) PCT No.: PCT/EP2019/054683
§ 371 (c)(1),
(2) Date: Aug. 31, 2020

(87) PCT Pub. No.: WO2019/170467
PCT Pub. Date: Sep. 12, 2019

(65) Prior Publication Data
US 2021/0280914 A1   Sep. 9, 2021

Related U.S. Application Data

(60) Provisional application No. 62/638,657, filed on Mar. 5, 2018.

(51) Int. Cl.
| | | |
|---|---|---|
| *H01M 4/04* | (2006.01) | |
| *H01M 10/0585* | (2010.01) | |
| *H01M 50/406* | (2021.01) | |
| *H01M 50/46* | (2021.01) | |
| *H01M 50/449* | (2021.01) | |
| *H01M 4/139* | (2010.01) | |

(52) U.S. Cl.
CPC ..... *H01M 10/0585* (2013.01); *H01M 4/0411* (2013.01); *H01M 4/0435* (2013.01); *H01M 4/0483* (2013.01); *H01M 4/139* (2013.01); *H01M 50/406* (2021.01); *H01M 50/449* (2021.01); *H01M 50/46* (2021.01)

(58) Field of Classification Search
CPC ... H01M 50/406; H01M 50/46; H01M 50/449
See application file for complete search history.

(56) References Cited

U.S. PATENT DOCUMENTS

| | | |
|---|---|---|
| 6,171,723 B1 | 1/2001 | Loch et al. |
| 6,503,432 B1 | 1/2003 | Barton et al. |
| 6,624,383 B1 | 9/2003 | Lichtenstein et al. |
| 6,664,006 B1 | 12/2003 | Munshi |
| 7,700,019 B2 | 4/2010 | Lavoie et al. |
| 9,337,471 B2 | 5/2016 | Cobb |
| 9,793,525 B2 | 10/2017 | Johnson et al. |
| 2004/0159964 A1* | 8/2004 | Lavoie ............... H01M 4/0404 264/408 |
| 2005/0139811 A1 | 6/2005 | Aisenbrey |
| 2006/0032045 A1 | 2/2006 | Naarmann et al. |
| 2006/0141351 A1 | 6/2006 | Suh |
| 2008/0118827 A1 | 5/2008 | Call et al. |
| 2010/0192364 A1 | 8/2010 | Suzuki et al. |
| 2014/0099538 A1* | 4/2014 | Johnson ............ H01M 10/0436 429/231.95 |
| 2014/0186519 A1* | 7/2014 | Cobb ................. H01M 4/0483 427/58 |
| 2015/0056492 A1* | 2/2015 | Huang ................. H01M 50/42 521/62 |
| 2015/0311002 A1* | 10/2015 | Okada ................ H01M 4/0404 427/79 |

FOREIGN PATENT DOCUMENTS

| | | |
|---|---|---|
| DE | 101 18 639 A1 | 10/2002 |
| WO | 00/52085 A1 | 9/2000 |

OTHER PUBLICATIONS

International Search Report corresponding to PCT Application No. PCT/EP2019/054683, dated Jun. 12, 2019 (3 pages).

* cited by examiner

*Primary Examiner* — Austin Murata
(74) *Attorney, Agent, or Firm* — Maginot, Moore & Beck LLP

(57) ABSTRACT

A method of co-extruding battery components includes forming a first thin film battery component via hot melt extrusion, and forming a second thin film battery component via hot melt extrusion. A surface treatment is applied to a surface region of at least one of the first and second components so that, relative to a remainder of the at least one component, the surface region has at least one of a decreased inter-particle distance, a decreased amount of polymer binder material, and an increased amount of exposed ionically conductive material. The first and second components are fed through a co-extrusion die to form a co-extruded multilayer thin film.

16 Claims, 9 Drawing Sheets

HOT MELT EXTRUDED SOLID STATE BATTERY COMPONENTS

RELATED APPLICATIONS

This application is a 35 U.S.C. § 371 National Stage Application of PCT/EP2019/054683, filed on Feb. 26, 2019, which claims the benefit of priority to U.S. Provisional Application No. 62/638,657, filed on Mar. 5, 2018, the disclosures of which are incorporated herein by reference in their entirety.

TECHNICAL FIELD

This disclosure relates generally to batteries and, more particularly, solid state batteries.

BACKGROUND

Unless otherwise indicated herein, the materials described in this section are not prior art to the claims in this application and are not admitted to the prior art by inclusion in this section.

Lithium (Li) metal has several qualities that have motivated efforts to incorporate Li metal-based components into batteries. Li metal has a theoretical capacity of 3860 mAh/g, and thus offers the highest capacity of any known anode material for an Li-ion battery. As a result, batteries with lithium-metal or lithium-alloy anodes can have a higher specific energy than batteries with anodes formed from other materials. For instance, lithium/sulfur and lithium/air batteries have the potential to reach a specific energy of 500 to 1000 Wh/kg, or more. These desirable qualities, however, come alongside tradeoffs that impede the use of Li metal as an anode for a battery.

In particular, the longevity of a battery with a Li metal anode is generally limited due to the formation of electronically conducting dendritic structures. During charging, Li ions move from a cathode to the anode, and vice versa during discharge. Over successive charging/discharging cycles, Li ions have a tendency to build up in needle-like or moss-like structures, i.e. "dendrites," rather than being deposited evenly. Dendrites may form for various reasons, including discontinuities in the surface of the anode, impurities within the anode, and variation in a characteristic within the anode, such as current density ($mA/cm^2$), during a charging process. The buildup of Li ions into dendrites over successive cycles thus leeches Li metal material from the anode, and can lead to parasitic capacity loss in the battery. Further, in a worst-case scenario, a dendrite can continue to grow and form a short circuit between the anode and cathode of the battery. A short between battery electrodes can severely decrease the longevity of the battery, and is potentially dangerous.

In an effort to inhibit the growth of dendrites, batteries with Li metal anodes generally incorporate mechanically rigid separators such as solid state polymeric materials, composite oxides, glasses, and other compounds. Such materials can act as a mechanical confiner that physically restrains dendrite growth from forming a short within a battery. However, conventional solid-state separator materials have tradeoffs that can impose limitations on the process used to form the battery, the materials and structure of the battery, and the operating conditions and characteristics of the battery.

For example, solid-state oxide separator materials typically require very high temperature formation processes, e.g. sintering, which may result in temperatures during battery formation that are above stability temperatures for other battery components. For instance, cathode active materials typically made up of transition metal oxides (Ni, Co, Al, Fe, Mn, etc. . . . ) and phosphates and the like have lower stability temperatures compared to the very high sintering temperatures that occur during sintering. Thus, the use of a solid state oxide for separator material either limits the materials that are usable for the cathode active material, or requires that the formation of the battery separates the formation of the separator and cathode. Conventional cathode active materials like those listed above may also have high solid-solid interfacial impedance, which can negatively impact the charging rate capability of the battery. Thus, the use of solid-state separator material can also lead to a battery with a decreased charging rate.

In another example, solid state sulfide separator materials generally have material properties that result in such materials being unstable or incapable of forming an acceptable separator embodied as a thin film, e.g. having a thickness of about 20 micrometers or less. Thus, such materials can impose limitations on the types of batteries that can be formed.

Further, for several conventional solid-state separator materials, the ability to inhibit dendrite formation and growth is a tradeoff for a decrease in the favorability of the material as a separator relative to other materials. In a typical battery, a separator is desirably not electronically conductive, and is chemically stable with the materials used for the anode and cathode. Many separator materials that inhibit dendrite growth have an increased reactivity with battery components, or exhibit a decreased electrical conductance relative to other materials.

Additionally, as a practical consideration, a separator material is desirably adapted for large scale production. However, many of the materials that may inhibit dendrite formation and growth are not well adapted to production processes that enable large scale production. Many traditional solid state materials require processes such as tape-casting, cold/hot pressing, sintering, and annealing, which are batch processes that are generally unable to produce output at high volume.

Therefore, techniques that enable the use of a solid state lithium anode in high energy density batteries would be beneficial. Separator materials that are able to sustain high charging currents without the growth of dendrites would also be beneficial. Improvements in solid-solid interfaces in battery components, and improvements in fabrication enabling high volume production would also be beneficial.

SUMMARY

According to an exemplary embodiment of the disclosure, a method of co-extruding battery components includes forming a first thin film battery component via hot melt extrusion, and forming a second thin film battery component via hot melt extrusion. The method further includes applying a surface treatment to a surface region of at least one of the first thin film battery component and the second thin film battery component so that, relative to a remainder of the at least one of the first and second thin film component, the surface region has at least one of a decreased inter-particle distance, a decreased amount of polymer binder material, and an increased amount of exposed ionically conductive material. The method also includes feeding the first thin film battery component and the second thin film battery component through a co-extrusion die to form a co-extruded multilayer thin film.

DETAILED DESCRIPTION

For the purposes of promoting an understanding of the principles of the disclosure, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Introduced herein is a separator for a high energy density battery with a lithium-based anode, in which the separator is configured to inhibit the growth of dendrites during a charging process for the battery with a high charging rate. Also introduced herein is a method for forming one or more battery components via hot melt extrusion. Such methods enable fine-tuning of various material and battery parameters. Further introduced herein is a method for forming battery components via co-extrusion. Such methods result in an improved solid-solid interface between battery components. Additionally introduced is a method of forming a hybrid solid-liquid cathode that enables the incorporation of liquid electrolyte materials into cathodes formed using roll-to-roll fabrication.

Figure 1:
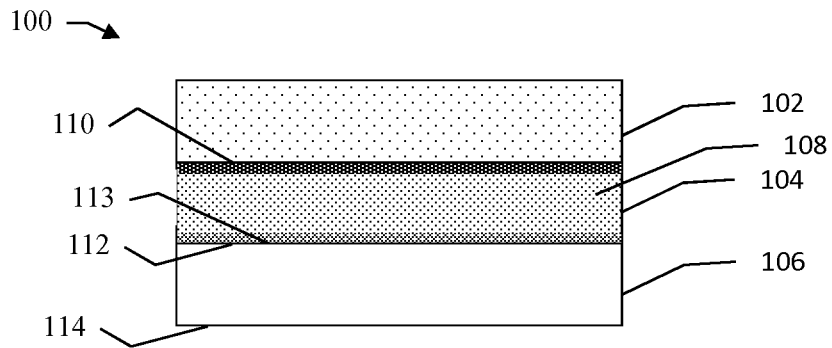
FIG. 1 is a schematic depiction of an exemplary embodiment of a battery formed by thin film components according to this disclosure.

FIG. 1 depicts an exemplary battery 100 according to this disclosure. The battery 100 includes an anode layer 102, a separator layer 104, and a cathode layer 106. In some embodiments, the battery 100 is a thin film battery with a total thickness of about 100 micrometers or less. In some embodiments, the battery 100 is wound up or folded to form a battery package.

In some embodiments, the anode layer 102 includes a Li-based active material such as a Li metal or a Li-alloy, e.g. Li—In, Li—Sn, or the like. In some embodiments, the anode layer 102 also includes a polymer binder material. Other metal-based anodes are used in other embodiments.

In some embodiments, the cathode layer 106 includes a mixture of cathode active ("CA") material, electronic conducting material, solid ionically conductive ("SIC") material, primary polymer binder material, and secondary polymer binder material. Any acceptable CA material is usable such as layered oxides, phosphates, and other variations of transition metals such as Ni, Co, Mn, Fe, Al etc., e.g. Lithium cobalt oxide (LCO), lithium nickel cobalt manganese oxide (NCM), lithium nickel cobalt aluminum oxide (NCA), lithium iron phosphate (LFP), or combinations thereof. In some embodiments, particles of CA material are coated with a surface coating that includes one or more of an oxide, e.g. Niobium oxides, titanium oxides, Alumina, AlPO4, ZrP2O7, LiNbO3, MgO, ZrO2, and etc., sulfides e.g. lithium phosphorous sulfide (LPS), fluorides e.g. lithium fluoride (LiF) and aluminum fluoride (AlF), and the like.

Any acceptable electronic conducting material is usable for the cathode layer 106, such as carbon black ("CB"), graphite, metal particles, graphene Nano sheets/flakes, carbon nanotubes, or the like, or combinations thereof. The SIC material in the cathode layer 106 is ionically conductive for ions that are transferred between the anode layer 102 and the cathode layer 106. Any acceptable SIC material is usable for the cathode layer 106, including oxides (e.g. garnet, perovskites, and the like), sulfides (e.g. argyrodites, phosphosulfides such as LGPS, and the like), glassy materials of oxides/sulfides, other chemical forms such as nitrides/phosphates and sodium-superionic-conductor (NASICON) type compounds such as $Na_{1+x}Zr_2Si_xP_{3-x}O_{12}$ ($0 \leq x \leq 3$), and combinations thereof. Any acceptable form of SIC material is usable for the cathode layer 106, such as crystalline, amorphous, or a mixture thereof.

In some embodiments, the SIC material in the cathode layer 106 includes particles of a substantially uniform size. In some embodiments, the SIC material in the cathode layer 106 includes a distribution of particles of different sizes. A distribution of different size particles can improve inter-particle contact and increase an amount of material per volume within the cathode layer 106. In some embodiments, the particles of the SIC material in the cathode layer 106 have surfaces that have been treated or modified, as discussed in further detail below, to reduce inter-particle contact resistance.

Any acceptable polymer material is usable for the primary polymer binder, such as Poly lactone, Polyethylene terephthalate (PET), Polyvinylidene fluoride (PVDF), Polytetrafluoroethylene (PTFE), polyolefin, Polyimide, polyester, polyamide, heat sensitive polymer, viscose or acrylic light sensitive polymer, rubber, polymer blends, cyanoethyl polyvinyl alcohol (PVA-CN) in succinonitrile (SN), and combinations thereof. In some embodiments, the material of the primary polymer binder is matched with a polymer binder included in the separator layer 104 as discussed below. In some embodiments, the material of the primary polymer binder is different from the material of the polymer binder of the separator layer 104.

Any acceptable polymer material is usable for the secondary polymer binder. In some embodiments, the secondary polymer binder includes an ion conducting polymer material, e.g., high molecular weight polyethylene oxide (PEO) with Li conducting salt. In such embodiments, the ion conducting polymer material acts as buffer between the SIC material and the CA material.

In some embodiments, instead of including the secondary polymer binder, the cathode layer 106 includes a porous structure filled with a liquid electrolyte material. As discussed in further detail below, in some embodiments, the cathode layer 106 is formed with a pore former material such as hydrophilic polyvinylpyrrolidone (PVP) or camphor in place of the secondary polymer binder, and the pore former material is then removed via heat treatment or by solvent treatment to generate a porous structure within the cathode layer 106 that is filled with the liquid electrolyte material. In such embodiments, any acceptable liquid electrolyte material is usable, such as carbonates and ethers containing ion conducting salts with stable anions such as $PF_6$, TFSI, $BF_4$, $ClO_4$, FSI, bis(oxalato)borate (BOB), and the like.

In some embodiments, a surface 113 of the cathode layer 106 facing the separator layer 104 has a property that is different than a remainder of the cathode layer 106, such as via a surface treatment as discussed in further detail below. For example, in some embodiments, the different property includes one or more of a decreased inter-particle distance between SIC particles, exposed SIC particles on the surface 113 of the cathode layer 106, relative to a remainder of the cathode layer 106, or another property resulting in an improved interface between the surface 113 of the cathode layer 106 and separator layer 104. In some embodiments, an opposite surface 114 of the cathode layer has a further property that is different than a remainder of the cathode layer 106 in order to, for example, improve an interface between the cathode layer 106 and a current collector, decrease inter-particle distances between SIC particles, or expose SIC particles on the surface 114 of the cathode layer 106

The separator layer 104 includes a main portion 108, a first surface region 110 that forms an interface with the anode layer 102, and a second surface region 112 that forms a second interface with the cathode layer 106. The main portion 108 includes a mixture of a majority component and a minority component.

The majority component includes at least one SIC material. Any acceptable SIC material is usable for the separator layer 104, and any acceptable form of SIC material is usable for the separator layer 104. In some embodiments, the SIC material in the separator layer 104 includes particles of a substantially uniform size. In some embodiments, the SIC material in the separator layer 104 includes a distribution of particles of different sizes. In some embodiments, the particles of the SIC material in the separator layer 104 have surfaces that have been treated or modified, as discussed in further detail below, to reduce inter-particle contact resistance.

The minority component includes particles of at least one polymeric binder such as polycarbonate, polylactone, PET, PVDF, PTFE, polyolefin, polyimide, polyester, polyamides, heat sensitive polymers, viscose or acrylic light sensitive polymers, rubber, polymer blends, or combinations thereof. In some embodiments, the polymeric binder is ionically conductive. In some embodiments, the polymeric binder is not ionically conductive. It should be understood that in embodiments where the polymeric binder is not ionically conductive, the separator layer 104 is still ionically conductive due to the SIC in the majority component. In some embodiments, the polymeric binder material has a material stiffness such that the polymeric binder material acts as a mechanical confiner that inhibits dendrite growth through the separator layer 104.

The majority component constitutes about 60% to about 98% of the total material of the main portion 108 of the separator layer 104, so as to exceed an amount of SIC material needed to enable a percolation threshold for conductance in a three-dimensional composite. In some embodiments, the majority component is uniformly and homogeneously distributed with the minority component within the main portion 108 of the separator layer 104. In some embodiments, the majority component is non-homogeneously distributed according to a graded arrangement corresponding to the materials of the anode layer 102 and cathode layer 106. For example, in some embodiments, the majority component includes various SIC materials arranged in a gradient so that the SIC material within the surface regions 110 and 112 is less reactive with the materials of the anode layer 102 and cathode layer 106, respectively, relative to the various SIC materials in other portions of the separator layer 104.

In some embodiments, the SIC material includes a relatively higher proportion of oxide rich material in the first surface region 110 of the separator layer 104. In some embodiments, the SIC material includes a relatively higher proportion of sulfide rich material in the second surface region 112 of the separator layer 104 interfaced with the cathode layer 106. In some embodiments, the SIC material is arranged according to a gradient that varies from a higher proportion of oxide rich material and lower proportion of sulfide rich material at the first surface region 110 to a lower proportion of oxide rich material and higher proportion of sulfide rich material at the second surface region 112.

In some embodiments, the first surface region 110 and the second surface region 112 include a mixture of materials that is similar to the mixture for the main portion 108. In some embodiments, the first surface region 110 and second surface region 112 have at least one different property relative to the main portion 108 that enables an improved interface with the anode layer 102 and cathode layer 106, respectively. In some embodiments, the surface regions 110 and 112 have a lower amount of the polymeric binder relative to the main portion 108. In some embodiments, the polymeric binder is completely removed from the surface regions 110 and 112. In some embodiments, an average inter-particle distance between particles of SIC material in the surface regions 110 and 112 is lower relative to an average inter-particle distance between particles of SIC material in the main portion 108. In some embodiments, the surface regions 110 and 112 are structured so that particles of SIC material are directly exposed to the anode layer 102 and cathode layer 106, respectively. In some embodiments, the surface regions 110 and 112 are formed by applying one or more surface treatments to the mixture of materials for the main portion 108, as discussed in further detail below.

Figure 2:
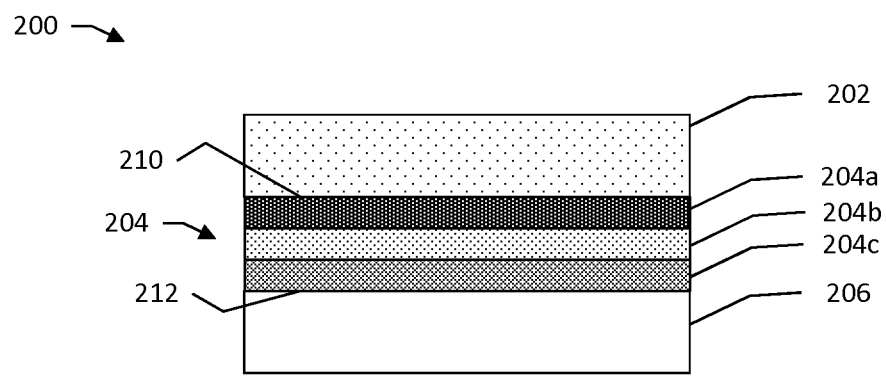
FIG. 2 is a schematic depiction of another exemplary embodiment of a battery formed by thin film components according to this disclosure.

FIG. 2 depicts another exemplary embodiment of a battery 200 according to this disclosure. The battery 200 includes an anode layer 202, a separator layer 204, and a cathode layer 206. The separator layer 204 includes a plurality of sub-layers. In some embodiments, the separator layer includes three sub-layers 204a-c. In some embodiments, the sub-layer 204a forms an interface 210 with the anode layer 202, the sub-layer 204c forms an interface 212 with the cathode layer 206, and the sub-layer 204b is positioned between the sub-layer 204a and the sub-layer 204c. In other embodiments, separator layers include other numbers of sub-layers.

Each of the sub-layers 204a-c includes a mixture of materials similar to the mixture of materials in the main portion 108 of the separator layer 104 in the battery 100 discussed above with regard to FIG. 1. However, the mixture of materials within the sub-layers 204a-c varies in at least one property such as structure, composition, or the like. The sub-layers 204a-c are arranged within the separator layer 204 so as to form a gradient for the at least one varying property. In some embodiments, SIC material in the sub-layer 204a includes a relatively high proportion of oxide rich material and a relatively low proportion of sulfide rich material, SIC material in the sub-layer 204c includes a relatively high proportion of sulfide rich material and a relatively low proportion of oxide rich material, and SIC material in the sub-layer 204b includes a mixture of oxide rich material and sulfide rich material. In such embodiments, the sub-layers 204a-c form a gradient from relatively oxide rich and sulfide poor SIC material in the sub-layer 204a to relatively sulfide rich and oxide poor SIC material in the sub-layer 204c.

Figure 3:
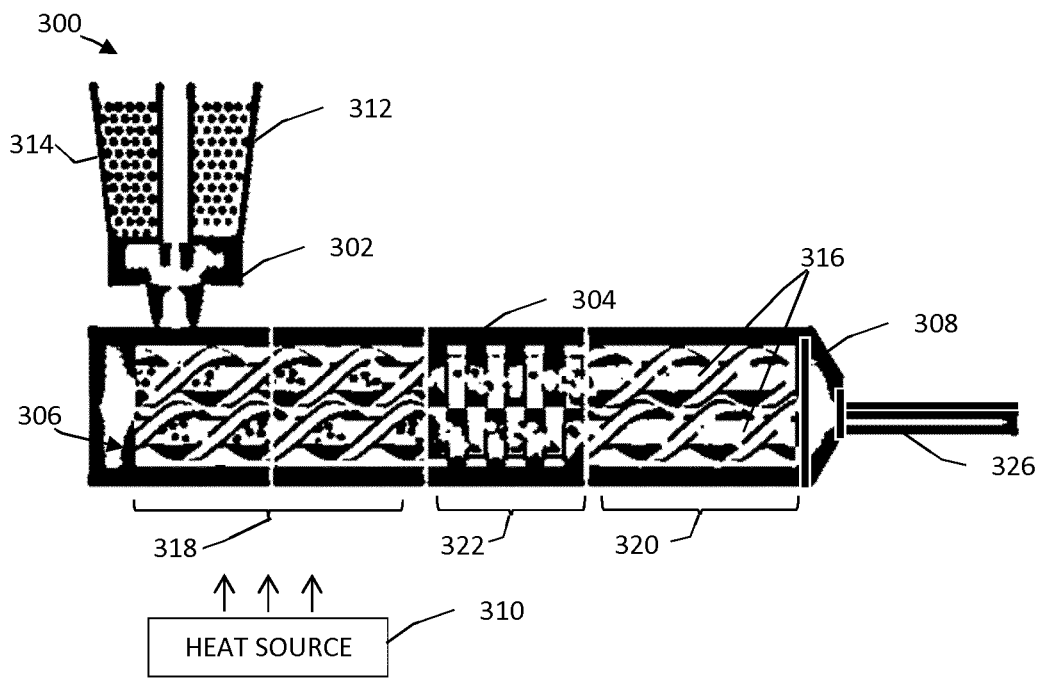
FIG. 3 is a schematic depiction of an exemplary embodiment of a twin screw extruder device usable to form a thin film component of a battery via hot melt extrusion according to this disclosure.

In some embodiments, such as embodiments resulting from the various methods discussed below, a layer of a battery is formed via hot melt extrusion. Any acceptable hot melt extrusion process is usable, such as a process using a screw extruder, ram extruder, roll extruder, gear extruder, planetary spindle extruder, or the like. FIG. 3 depicts an exemplary embodiment of a twin screw extruder 300 usable to form a layer of a battery via hot melt extrusion according to this disclosure. The twin screw extruder 300 includes a feeding aperture 302, a barrel 304, a screw assembly 306, a die 308, and a heat source 310. The feeding aperture 302 includes a first bay 312 for particles of solid material (e.g. anode material, cathode material, or separator material depending on the layer to be extruded), and a second bay 314 for polymeric material. The feeding aperture 302 is configured to feed a mixture of the solid material and the polymeric material into the barrel 304 at relative rates corresponding to the proportions of those materials to be present in the resulting layer.

The screw assembly 306 includes a pair of screws 316 that include a first threaded portion 318, a second threaded portion 320, and a mixing portion 322 positioned between the threaded portions 318 and 320. The screw assembly 306 is arranged within the barrel 304 such that the first threaded portion 318 receives the material mixture from the feeding aperture 302. The screw assembly 306 is operable to rotate the screws 316 about their respective axes, whereby the pitch of the screws 316 causes the material mixture to move along the barrel 304.

The heat source 310 is configured to apply heat to material along the first threaded portion 318 of the screw assembly 306 to melt the material mixture. The heat is at or above a melting temperature of the polymer material. The mixing portion 322 receives the melted material mixture from the first threaded portion 318, and includes mixing teeth that further mix the melted material mixture due to the rotation of the screws 316. The second threaded portion 320 homogenizes the melted material mixture, and feeds the melted material mixture to the die 308. The die 308 is configured to extrude the melted material mixture as a thin film onto a cooling substrate 326. As discussed in further detail below, in various embodiments, the substrate 326 is a temporary surface, a current collector, or another layer for a battery.

Figure 4:
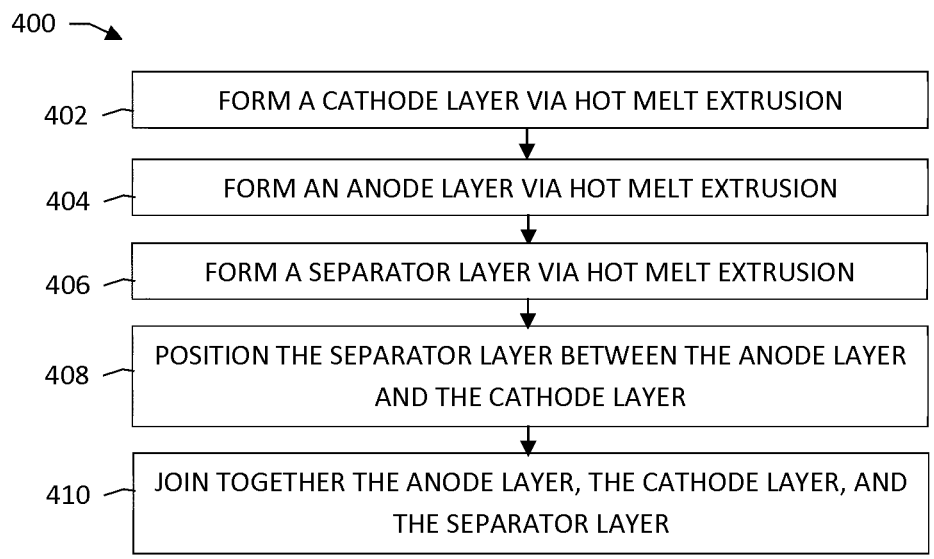
FIG. 4 is a flow diagram depicting an exemplary embodiment of a method for forming a battery with thin film components according to this disclosure.

FIG. 4 depicts a flow diagram of an exemplary method 400 of forming a battery according to this disclosure. In the description of methods herein, it should be understood that in various embodiments, the steps of the methods are performed in any feasible chronological order, regardless of the order shown in the figures or the order in which the steps are described. In some embodiments, multiple steps are performed simultaneously. Further, in various embodiments, individual steps are repeated or omitted, and additional steps are added.

At block 402, a cathode layer is formed via hot melt extrusion. At block 404, an anode layer is formed via hot melt extrusion. At block 406, a separator layer is formed via hot melt extrusion. At block 408, at least one surface region of at least one of the anode layer, separator layer, and cathode layer is modified via a surface treatment. At block 410, the separator layer is positioned between the anode layer and the cathode layer, and at block 412, the anode layer, separator layer, and cathode layer are joined together. Each of the foregoing blocks is discussed in more detail below.

Figure 5:
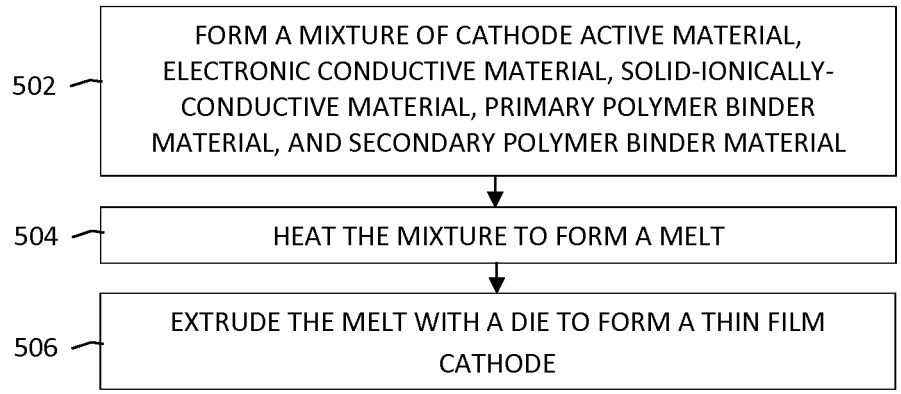
FIG. 5 is a flow diagram depicting an exemplary embodiment of a method for forming a thin film cathode according to this disclosure.

FIG. 5 depicts an exemplary method 500 for forming a cathode layer via hot melt extrusion (block 402 of FIG. 4). At 502, CA material, electronic conductive material, SIC material, primary polymer binder material, and secondary polymer binder material are combined to form a material mixture. At 504, heat is applied to the material mixture at or above a melting temperature of the primary polymer binder material to form a melt. At 506, the melt is extruded by a die as a thin film cathode layer. In some embodiments, the cathode layer is extruded as a stand-alone layer, i.e. not fixed to any other surface or object. In some embodiments, the cathode layer is extruded onto a temporary substrate that is configured to release the cathode layer for assembly. In some embodiments, the cathode layer is extruded directly onto a current collector such as a mesh made from, for example, Ni, Al, Ti, W, stainless steel or the like, or combinations thereof. In some embodiments, the cathode layer is extruded directly onto a separator layer. In some embodiments, the cathode layer is extruded directly onto a separator-anode bi-layer. In some embodiments, the cathode layer is co-extruded with the separator layer or the separator layer and the anode layer, as discussed in further detail below.

Figure 6:
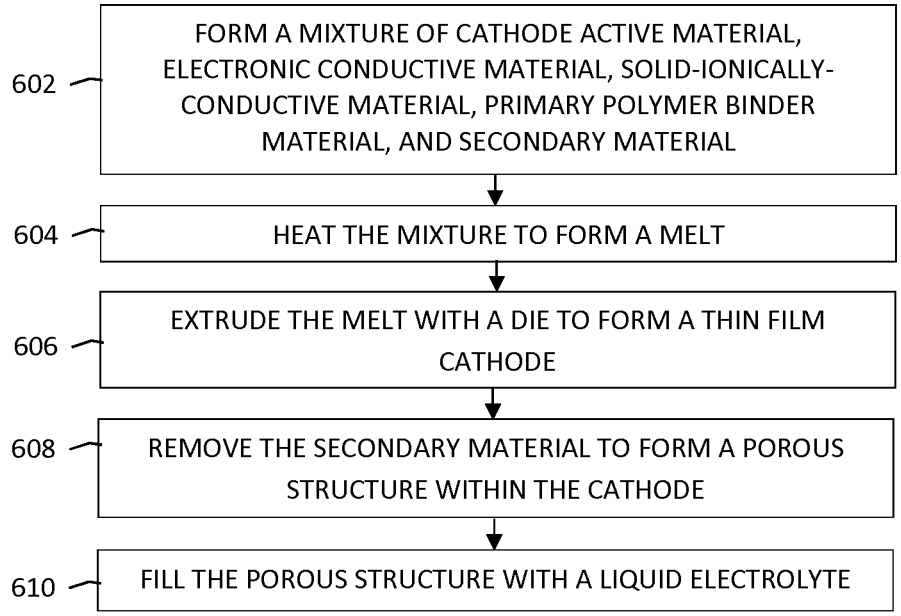
FIG. 6 is a flow diagram depicting another exemplary embodiment of a method for forming a thin film cathode according to this disclosure.

FIG. 6 depicts another exemplary method 600 for forming a cathode layer via hot melt extrusion (block 402 of FIG. 4). At 602, CA material, electronic conductive material, SIC material, primary polymer binder material, and secondary material are combined to form a material mixture. In some embodiments, the secondary material includes a polymer binder material. In some embodiments, the secondary material includes a pore former material. At 604, heat is applied to the material mixture at or above a melting temperature of the primary polymer binder material to form a melt. At 606, the melt is extruded by a die as a thin film cathode layer.

At 608, the secondary material is removed so as to form a porous structure within the cathode layer. In some embodiments, removing the secondary material includes applying heat to the cathode layer above a melting temperature of the secondary material. In some embodiments, removing the secondary material includes applying a solvent to the cathode layer that is configured to dissolve the secondary material. AT 610, a liquid electrolyte is applied to the cathode layer so as to fill the porous structure.

Figure 7:
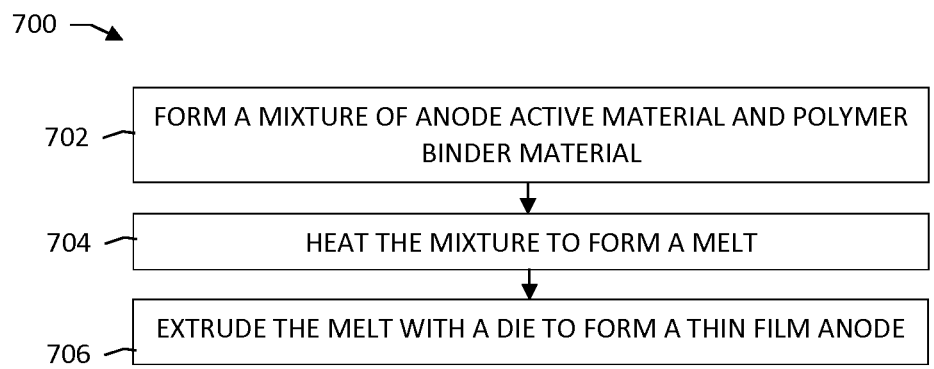
FIG. 7 is a flow diagram depicting an exemplary embodiment of a method for forming a thin film anode according to this disclosure.

FIG. 7 depicts an exemplary method 700 for forming an anode layer via hot melt extrusion (block 404 of FIG. 4). At 702 particles of active anode material and polymer binder material are combined to form a material mixture. At 704, heat is applied to the material mixture at or above a melting temperature of the polymer binder material to form a melt. At 706, the melt is extruded by a die as a thin film anode layer.

Figure 8:
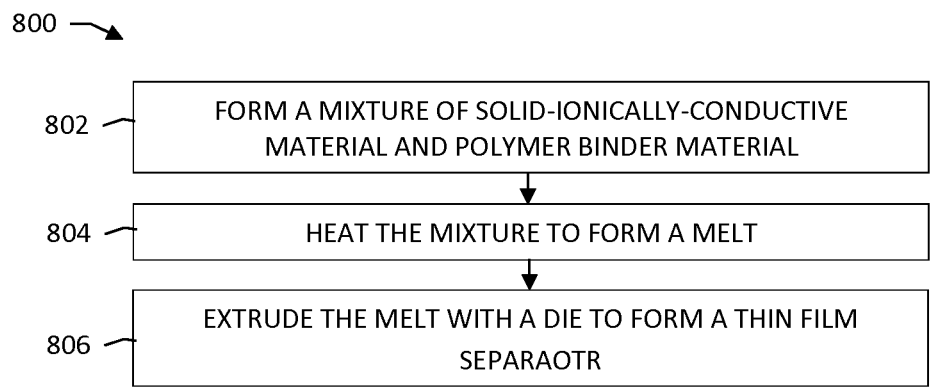
FIG. 8 is a flow diagram depicting an exemplary embodiment of a method for forming a thin film separator according to this disclosure.

FIG. 8 depicts an exemplary method 800 for forming a separator layer via hot melt extrusion (block 406 of FIG. 4). At 802, SIC material as a majority component and polymer binder material as a minority component are combined to form a material mixture. At 804, heat is applied to the material mixture at or above a melting temperature of the polymer binder material to form a melt. At 806, the melt is extruded by a die as a thin film separator layer. In some embodiments, the separator layer is extruded as a stand-alone layer, i.e. not fixed to any other surface or object. In some embodiments, the separator layer is extruded onto a temporary substrate that is configured to release the cathode layer for layer assembly. In some embodiments, the separator layer is extruded directly onto a cathode layer. In some embodiments, the separator layer is extruded directly onto an anode layer. In some embodiments, the separator layer is co-extruded as a bi-layer with the cathode layer or the anode layer, as discussed in further detail below. In some embodiments, the separator layer is co-extruded with the cathode layer and the anode layer as a tri-layer, as discussed in further detail below.

Figure 9:
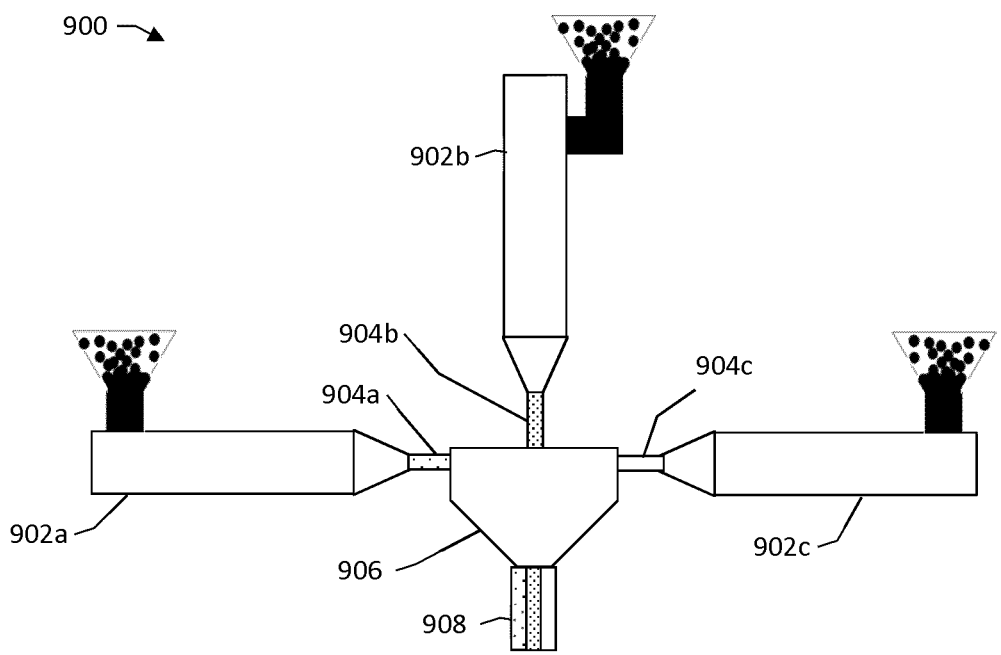
FIG. 9 is a flow diagram depicting an exemplary embodiment of a system for co-extruding multiple thin film battery components to form a co-extruded multi-layer thin film according to this disclosure.

FIG. 9 depicts an exemplary embodiment of a system 900 for co-extruding multiple layers for a battery. The system 900 includes a respective hot melt extruder for each layer to be co-extruded. In the embodiment depicted in FIG. 9, the system 900 includes three extruders 902a-c to co-extrude a tri-layer of the three thin films 904a-c, but other embodiments use other numbers of extruders to co-extrude other numbers of layers. The system 900 further includes a co-extrusion die 906.

The thin films 904a-c are fed from the respective extruder 902a-c to the co-extrusion die 906. In some embodiments, one or more of the films 904a-c is fed directly from its respective extruder 902a-c to the co-extrusion die 906. In some embodiments, one or more of the films 904a-c is formed as a stand-alone layer or is disposed on a temporary substrate, such as via the methods discussed above. In some such embodiments, the previously formed thin film is re-heated to a temperature above the melting point of polymer material within the thin film prior to being fed to the co-extrusion die 906. In some embodiments, a surface treatment is applied to one or more of the thin films 904a-c prior to the prior to being fed to the co-extrusion die 906.

The co-extrusion die 906 joins the thin-films 904a-c and extrudes the thin-films 904a-c as a single multilayer thin film 908. In some embodiments, a surface treatment is applied to one or more of the thin films 904a-c after being fed to the co-extrusion die 906. In some embodiments, the co-extruded thin film is deposited onto a current collector, a temporary substrate, or the like, or is deposited as a stand-alone thin film.

Figure 10:
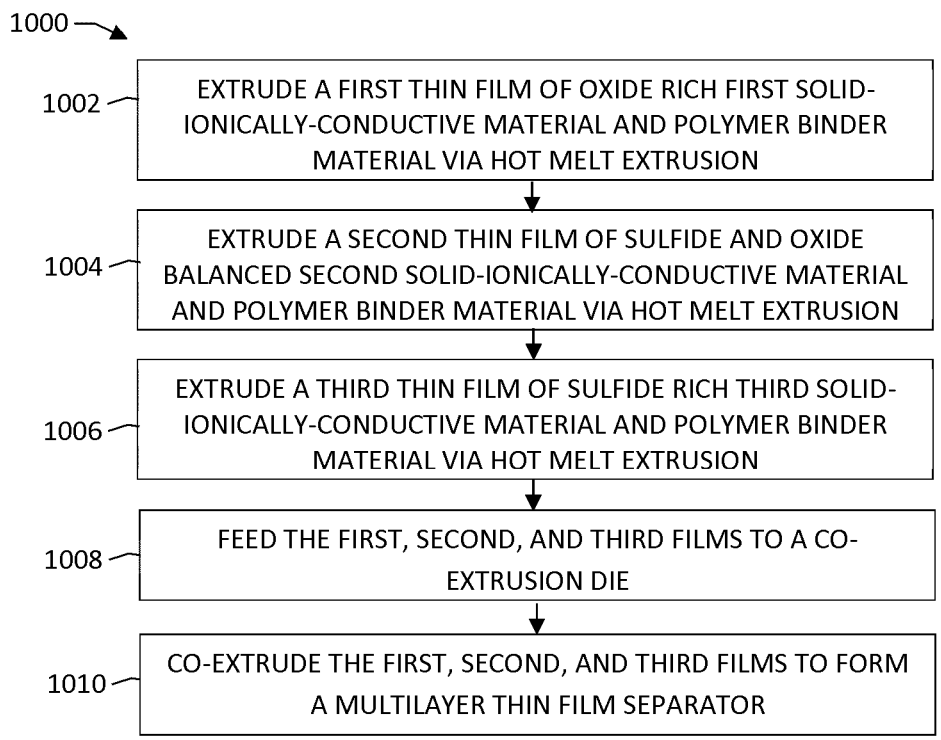
FIG. 10 is a flow diagram depicting another exemplary embodiment of a method for forming a thin film separator according to this disclosure.

FIG. 10 depicts another exemplary method 1000 for forming a separator layer via hot melt extrusion (block 406 of FIG. 4). In this embodiment, the separator layer includes a gradient of different SIC materials that vary from oxide rich to sulfide rich. At block 1002, oxide rich first SIC material as a majority component and polymer binder material as a minority component are extruded as a first thin film via hot melt extrusion. At block 1004, sulfide and oxide balanced second SIC material as a majority component and polymer binder material as a minority component are extruded as a second thin film via hot melt extrusion. At block 1006, sulfide rich third SIC material as a majority component and polymer binder material as a minority component are extruded as a third thin film via hot melt extrusion. At block 1008, the first, second, and third thin films are fed to a co-extrusion die. At block 1010, the first, second, and third thin films are co-extruded by the co-extrusion die to form a multilayer thin film separator.

Figure 11:
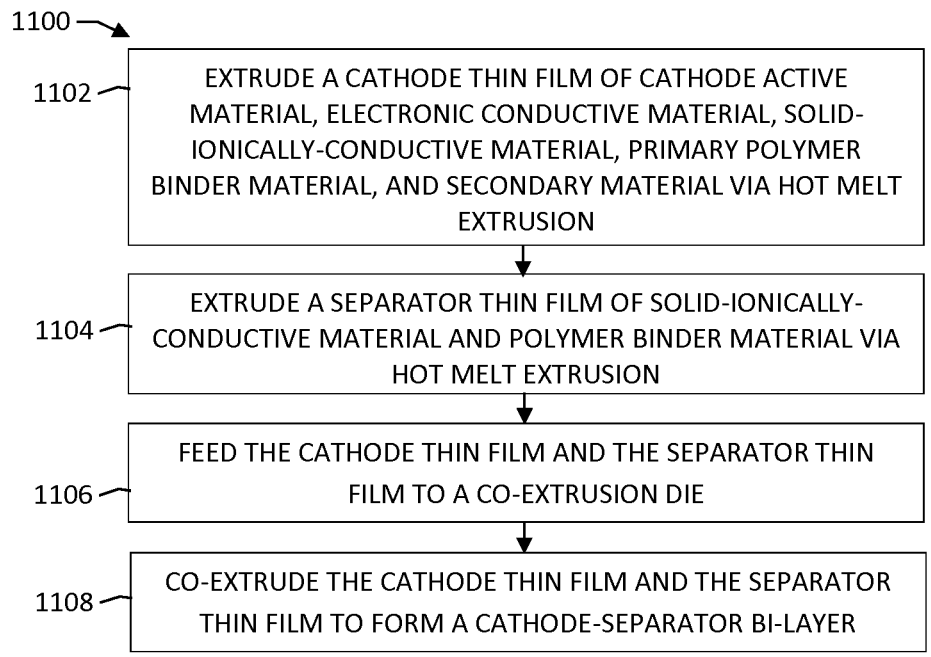
FIG. 11 is a flow diagram depicting an exemplary embodiment of a method for forming a thin film cathode-separator bi-layer according to this disclosure.

FIG. 11 depicts an exemplary method 1100 for forming a cathode-separator bi-layer according to this disclosure. At block 1102, CA material, electronic conductive material, SIC material, primary polymer binder material, and secondary polymer binder material are extruded as a cathode thin film via hot melt extrusion. At block 1104, SIC material as a majority component and polymer binder material as a minority component are extruded as a separator thin film via hot melt extrusion. At block 1106, the cathode thin film and separator thin film are fed to a co-extrusion die. In some embodiments, feeding the separator thin film to the co-extrusion die includes applying a surface treatment to at least one surface region of the separator thin film. In some embodiments, feeding the cathode thin film to the co-extrusion die includes applying a surface treatment to at least one surface region of the cathode thin film. At block 1108, the co-extrusion die co-extrudes the cathode thin film and separator thin film as a cathode-separator bi layer. In various embodiments, the cathode-separator bi layer is extruded onto a current collector or a temporary substrate, or is extruded as a stand-alone layer.

Figure 12:
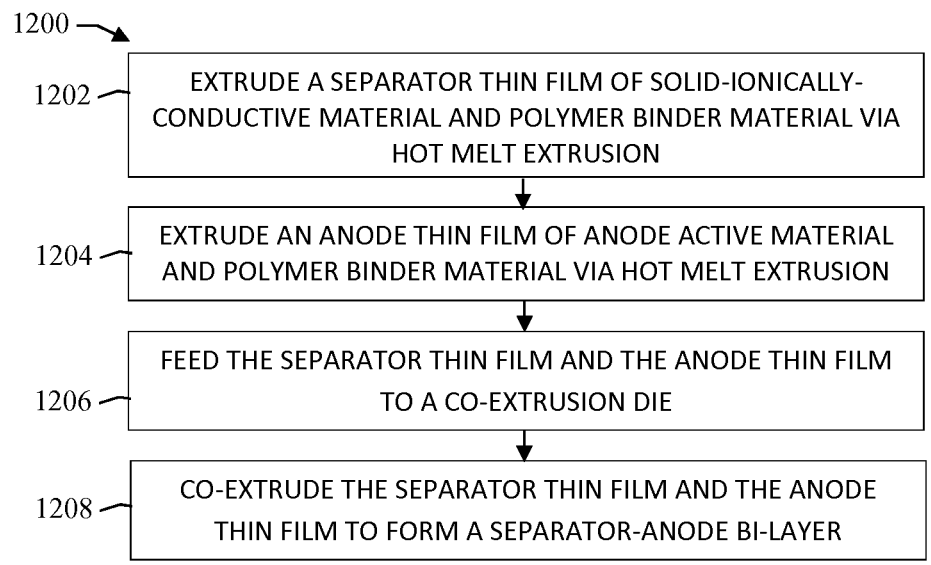
FIG. 12 is a flow diagram depicting an exemplary embodiment of a method for forming a thin film separator-anode bi-layer according to this disclosure.

FIG. 12 depicts an exemplary method 1200 for forming a separator-anode bi-layer according to this disclosure. At block 1202, SIC material as a majority component and polymer binder material as a minority component are extruded as a separator thin film via hot melt extrusion. At block 1204, particles of active anode material and polymer binder material are extruded as an anode thin film via hot melt extrusion. At block 1206, the separator thin film and anode thin film are fed to a co-extrusion die. In some embodiments, feeding the separator thin film to the co-extrusion die includes applying a surface treatment to at least one surface region of the separator thin film. At block 1208, the co-extrusion die co-extrudes the anode thin film and separator thin film as a separator-anode bi layer. In various embodiments, the separator-anode bi layer is extruded onto a current collector or a temporary substrate, or is extruded as a stand-alone layer.

Figure 13:
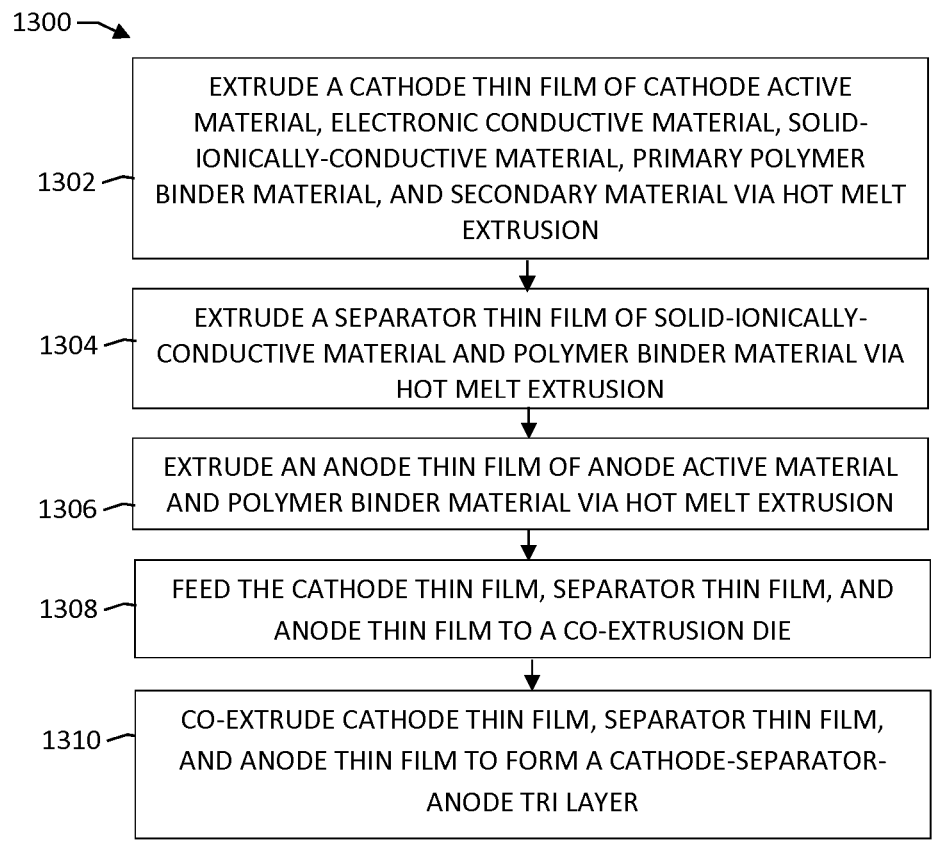
FIG. 13 is a flow diagram depicting an exemplary embodiment of a method for forming a thin film cathode-separator-anode tri-layer according to this disclosure.

FIG. 13 depicts an exemplary method 1300 for forming a cathode-separator-anode tri-layer according to this disclosure. At block 1302, CA material, electronic conductive material, SIC material, primary polymer binder material, and secondary polymer binder material are extruded as a cathode thin film via hot melt extrusion. At block 1304, SIC material as a majority component and polymer binder material as a minority component are extruded as a separator thin film via hot melt extrusion. At block 1306, particles of active anode material and polymer binder material are extruded as an anode thin film via hot melt extrusion. At block 1308, the cathode thin film, the separator thin film, and anode thin film are fed to a co-extrusion die. In some embodiments, feeding the separator thin film to the co-extrusion die includes applying a surface treatment to at least one surface region of the separator thin film. In some embodiments, feeding the cathode thin film to the co-extrusion die includes applying a surface treatment to at least one surface region of the cathode thin film.

At block 1310, the co-extrusion die co-extrudes the cathode thin film, the anode thin film, and separator thin film as a cathode-separator-anode tri layer with the separator layer positioned between the cathode layer and the anode layer. In various embodiments, the cathode-separator-anode bi layer is extruded onto a current collector or a temporary substrate, or is extruded as a stand-alone layer.

In some embodiments, such as various embodiments discussed above, a surface treatment is applied to one or more layers during a co-extrusion process. In some embodiments, the surface treatment includes a surface melting process in order to remove polymer binder material from a surface region of the treated layer. Any acceptable surface melting process is usable, such as a gas rich plasma application process, a Laser-assisted local melting process, or the like. In some embodiments, polymer binder material within the layer to be treated is sensitive to a solvent. In some embodiments, the surface treatment includes a solvent brushing process configured to remove polymer binder material from a surface region of the layer. In some embodiments, the surface treatment includes heat treating the layer at a temperature that, due to a volatility of the polymer binder material, causes an inter-particle distances between the SIC particles to decrease. In some embodiments, the surface treatment includes hot rolling the layer in order to further extrude the polymer binder material and decrease inter-particle distances between SIC particles in the layer.

In some embodiments, a current collector for a battery according to this disclosure is a mesh, a plate, or the like that is joined to a cathode layer or anode layer. In some embodiments, joining a layer to a current collector includes depositing a hot-melt extruded layer on the current collector. In some embodiments, joining a layer to a current collector includes a hot rolling or calendaring process. In some embodiments, the current collector is a layer that is at least partially formed via hot-melt extrusion. In some embodiments, joining a layer to a current collector includes feeding the layer and the current collector through a co-extrusion die.

Figure 14:
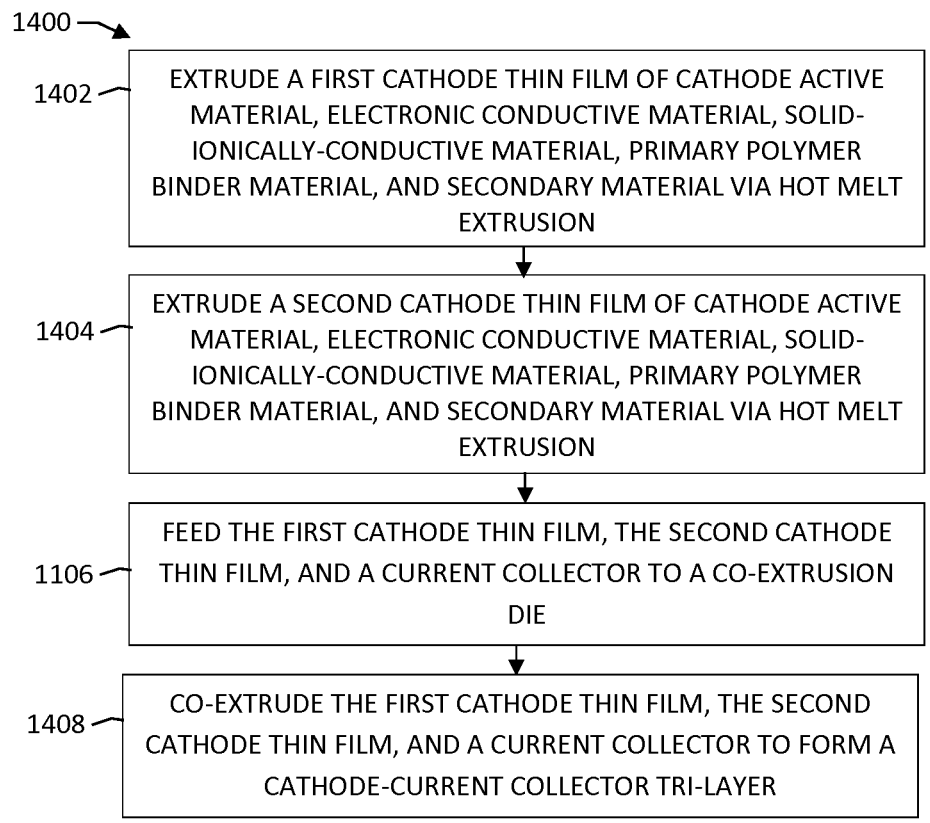
FIG. 14 is a flow diagram depicting an exemplary embodiment of a method for forming a thin film current collector-cathode tri-layer according to this disclosure.

FIG. 14 depicts an exemplary embodiment of a method 1400 for forming a co-extruded current collector-cathode tri-layer according to this disclosure. At block 1402, CA material, electronic conductive material, SIC material, primary polymer binder material, and secondary polymer binder material are extruded as a first cathode thin film via hot melt extrusion. At block 1404, CA material, electronic conductive material, SIC material, primary polymer binder material, and secondary polymer binder material are extruded as a second cathode thin film via hot melt extrusion. At block 1406, the first cathode thin film, the second cathode thin film, and a collector layer are fed to a co-extrusion die. At block 1408, the co-extrusion die co-extrudes the first cathode thin film, the second cathode thin film, and the collector layer as a tri-layer with the collector layer positioned between the first cathode layer and second cathode layer.

Figure 15:
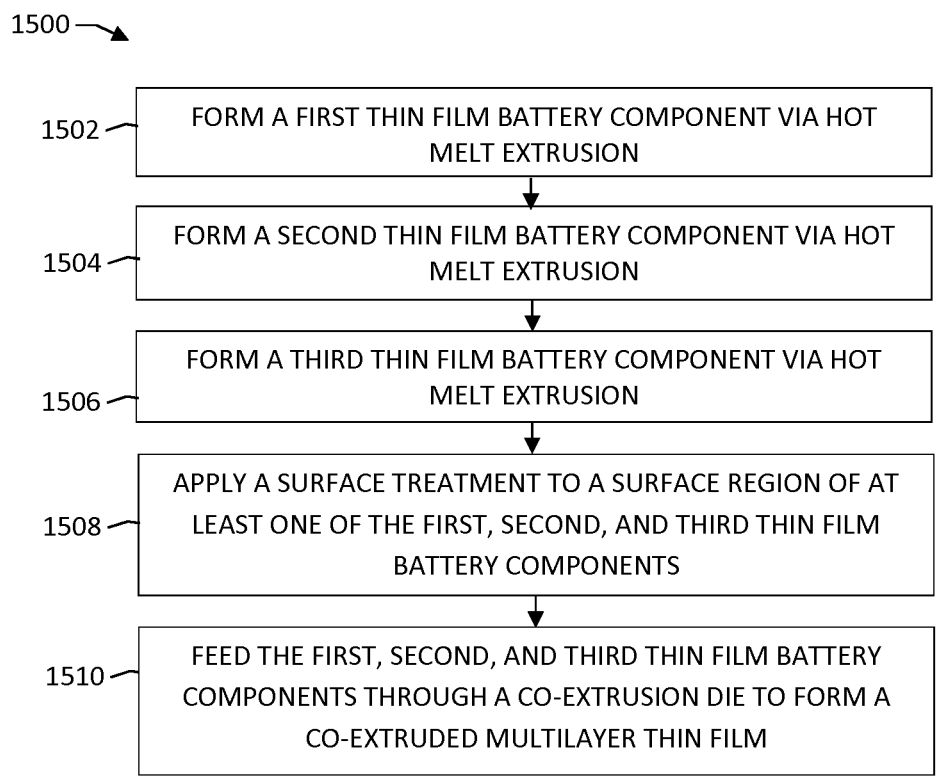
FIG. 15 is a flow diagram depicting another exemplary embodiment of a method for co-extruding multiple thin film battery components to form a co-extruded multi-layer thin film according to this disclosure

FIG. 15 depicts another exemplary embodiment 1500 for co-extruding battery components according to this disclosure. At block 1502, a first thin film battery component is formed via hot melt extrusion. In some embodiments, the first thin film battery component is one of an anode and a cathode. In some embodiments, forming the first thin film battery component via hot melt extrusion includes depositing the first thin film battery component onto a substrate. In some embodiments, the substrate is a current collector. In some embodiments, the first thin film battery component is a sub-layer of a multi-layer separator. In some embodiments, the first thin film battery component is formed with a porous structure.

At block 1504, a second thin film battery component is formed via hot melt extrusion. In some embodiments, the second thin film battery component is a separator. In some embodiments, the second thin film battery component is a cathode. In some embodiments, the second thin film battery component is a further sub-layer of a multi-layer separator. At block 1506, a third thin film battery component is formed via hot melt extrusion. In some embodiments, the third thin film battery component is an other of the anode and the cathode.

At block 1508, a surface treatment is applied to a surface region of at least one of the first thin film battery component and the second thin film battery component. As a result of the surface treatment, relative to a remainder of the at least one of the first and second thin film component, the surface region has at least one of (i) a decreased inter-particle distance, (ii) a decreased amount of polymer binder material, and (iii) an increased amount of exposed ionically conductive material. In some embodiments, the surface treatment includes removing polymer binder material from the surface region via a surface melting process. In some embodiments, the surface treatment includes removing polymer binder material from the surface region via a solvent brushing process. In some embodiments, the surface treatment includes reducing the inter-particle distances via a surface heat treatment. In some embodiments, the surface treatment includes reducing the inter-particle distances via a hot rolling process.

At block 1510, the first thin film battery component, the second thin film battery component, and the third thin film battery component are fed through a co-extrusion die to form a co-extruded multilayer thin film. In some embodiments, the second thin film battery component is positioned between the first thin film battery component and the third thin film battery component.

In some embodiments, instead of being fed through the co-extrusion die with the first thin film battery component and the second thin film battery component, the third thin film battery component is joined to a bi-layer formed from co-extrusion of the first thin film battery component and the second thin film battery component. In some embodiments, prior to feeding the first thin film battery component through the co-extrusion die, the first thin film battery component is removed from the substrate onto which the first thin film battery component was formed. In some embodiments, a current collector is fed through the co-extrusion die along with the thin film battery components. In some embodiments, a liquid electrolyte is added to the porous structure of the first thin film battery component.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

What is claimed is:

1. A method of co-extruding battery components, comprising:
forming a first thin film battery component via hot melt extrusion;
forming a second thin film battery component via hot melt extrusion;
applying a surface treatment to a surface region of at least one of the first thin film battery component and the second thin film battery component so that, relative to a remainder of the at least one of the first and second thin film component, the surface region has at least one of:
a decreased inter-particle distance;
a decreased amount of polymer binder material; and
an increased amount of exposed ionically conductive material; and
feeding the first thin film battery component and the second thin film battery component through a co-extrusion die to form a co-extruded multilayer thin film, wherein forming the first thin film battery component via hot melt extrusion includes depositing the first thin film battery component onto a substrate.

2. The method of claim 1, wherein:
the first thin film battery component is one of an anode and a cathode; and
the second thin film battery component is a separator.

3. The method of claim 2, further comprising:
forming a third thin film battery component via hot melt extrusion, wherein the third thin film battery component is an other of the anode and the cathode.

4. The method of claim 3, wherein the third thin film battery component is fed with the first thin film battery component and the second thin film battery component through the co-extrusion die to form the co-extruded multilayer thin film such that, in the co-extruded multilayer thin film, the separator is positioned between the anode and the cathode.

5. The method of claim 3, further comprising, joining the third thin film battery component to the separator of the co-extruded multilayer thin film so that the separator is positioned between the anode and the cathode.

6. The method of claim 1, wherein the substrate is a current collector.

7. The method of claim 1, further comprising:
prior to feeding the first thin film battery component and the second thin film battery component through the co-extrusion die, removing the first thin film battery component from the substrate.

8. The method of claim 1, wherein:
the first thin film battery component and the second thin film battery component are each cathodes; and
a current collector is fed with the first thin film battery component and the second thin film battery component through the co-extrusion die to form the co-extruded multilayer thin film such that, in the co-extruded multilayer thin film, the current collector is positioned between the first and second thin film battery components.

9. The method of claim 1, wherein the surface treatment includes removing polymer binder material from the surface region via a surface melting process.

10. The method of claim 1, wherein the surface treatment includes removing polymer binder material from the surface region via a solvent brushing process.

11. The method of claim 1 wherein the surface treatment includes reducing the inter-particle distances via a surface heat treatment.

12. The method of claim 1 wherein the surface treatment includes reducing the inter-particle distances via a hot rolling process.

13. The method of claim 1, further comprising:
forming a porous structure within the first thin film battery component by removing material from the first thin film battery component; and
filling the porous structure with a liquid material.

14. The method of claim 1, wherein:
the first thin film battery component is a first separator layer;
the second thin film battery component is a second separator layer that has at least one property that is different than a corresponding property of the first separator layer, such that the first separator layer and the second separator layer form a gradient of the at least one property through a thickness of the co-extruded multilayer thin film.

15. A method of co-extruding battery components, comprising:
forming a first thin film battery component via hot melt extrusion;
forming a second thin film battery component via hot melt extrusion;
applying a surface treatment to a surface region of at least one of the first thin film battery component and the second thin film battery component so that, relative to a remainder of the at least one of the first and second thin film component, the surface region has at least one of:
a decreased inter-particle distance;
a decreased amount of polymer binder material; and
an increased amount of exposed ionically conductive material; and
feeding the first thin film battery component and the second thin film battery component through a co-extrusion die to form a co-extruded multilayer thin film, wherein the surface treatment includes removing polymer binder material from the surface region via a surface melting process.

16. A method of co-extruding battery components, comprising:
forming a first thin film battery component via hot melt extrusion;
forming a second thin film battery component via hot melt extrusion;
applying a surface treatment to a surface region of at least one of the first thin film battery component and the second thin film battery component so that, relative to a remainder of the at least one of the first and second thin film component, the surface region has at least one of:
a decreased inter-particle distance;
a decreased amount of polymer binder material; and
an increased amount of exposed ionically conductive material; and
feeding the first thin film battery component and the second thin film battery component through a co-extrusion die to form a co-extruded multilayer thin film, wherein the surface treatment includes removing polymer binder material from the surface region via a solvent brushing process.

* * * * *